(12) United States Patent
Borot et al.

(10) Patent No.: US 9,242,516 B2
(45) Date of Patent: Jan. 26, 2016

(54) POWER COMPONENT AND INSTRUMENTED TYRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Martine Borot, Cebazat (FR); Jonathan Champredonde, Manzat (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/551,847

(22) Filed: Nov. 24, 2014

(65) Prior Publication Data
US 2015/0083811 A1 Mar. 26, 2015

Related U.S. Application Data

(62) Division of application No. 13/125,092, filed as application No. PCT/EP2009/063668 on Oct. 19, 2009, now Pat. No. 8,928,472.

(30) Foreign Application Priority Data

Oct. 20, 2008 (FR) ...................................... 08 57116

(51) Int. Cl.
*B60C 23/00* (2006.01)
*B60C 19/00* (2006.01)
*B60C 23/04* (2006.01)
*G06K 19/077* (2006.01)
*B29D 30/00* (2006.01)

(52) U.S. Cl.
CPC ............. *B60C 19/00* (2013.01); *B60C 23/0493* (2013.01); *G06K 19/07764* (2013.01); *G06K 19/07786* (2013.01); *B29D 2030/0077* (2013.01); *B29D 2030/0083* (2013.01); *B60C 2019/004* (2013.04); *B60C 2019/006* (2013.04); *Y10T 152/10* (2015.01); *Y10T 152/10495* (2015.01); *Y10T 428/239* (2015.01)

(58) Field of Classification Search
CPC .... B60C 23/00; B60C 23/0493; B60C 19/00; B60C 2019/004; B60C 2019/006; B29D 2030/0077; B29D 2030/0083; G06K 19/07764
See application file for complete search history.

(56) References Cited

U.S. PATENT DOCUMENTS

| 3,709,277 | A | | 1/1973 | Montagne | 152/374 |
| 3,787,806 | A | * | 1/1974 | Church | 340/447 |
| 4,067,235 | A | * | 1/1978 | Markland et al. | 73/146.5 |
| 5,562,787 | A | | 10/1996 | Koch et al. | 156/64 |
| 5,667,886 | A | | 9/1997 | Gough et al. | 428/331 |

(Continued)

FOREIGN PATENT DOCUMENTS

| DE | 1 948 497 | 6/1970 |
| EP | 0 639 472 A1 | 2/1995 |

(Continued)

*Primary Examiner* — Steven Lim
*Assistant Examiner* — Ryan Sherwin
(74) *Attorney, Agent, or Firm* — Fitzpatrick, Cella, Harper & Scinto

(57) ABSTRACT

A member for attachment to tire includes a functional object in suspension in a soft substance of very high deformability.

15 Claims, 2 Drawing Sheets

(56) References Cited

U.S. PATENT DOCUMENTS

| | | | |
|---|---|---|---|
| 6,599,956 B2 | 7/2003 | Montgomery et al. | 522/93 |
| 6,631,747 B2 | 10/2003 | Durif | 152/409 |
| 6,688,353 B1 | 2/2004 | Koch | 152/152.1 |
| 6,926,054 B2 | 8/2005 | Leblond et al. | 152/539 |
| 7,193,516 B2 | 3/2007 | Choi et al. | 340/572.1 |
| 7,926,527 B2 * | 4/2011 | Kleckner | 152/152.1 |
| 8,072,336 B2 | 12/2011 | Uehara et al. | 340/572.8 |
| 2005/0217774 A1 | 10/2005 | Borot | 152/152.1 |
| 2006/0016534 A1 | 1/2006 | Peyron et al. | 152/152.1 |
| 2008/0295933 A1 | 12/2008 | Lacour et al. | 152/152.1 |
| 2009/0294009 A1 | 12/2009 | Barguet et al. | 152/527 |
| 2010/0051160 A1 | 3/2010 | Daghini et al. | 152/527 |
| 2010/0230024 A1 | 9/2010 | Borot et al. | 152/450 |
| 2010/0276048 A1 | 11/2010 | Adamson et al. | 152/450 |

FOREIGN PATENT DOCUMENTS

| | | |
|---|---|---|
| EP | 0 689 950 A2 | 1/1996 |
| WO | WO 2005/002887 A2 | 1/2005 |

* cited by examiner

POWER COMPONENT AND INSTRUMENTED TYRE

CROSS REFERENCE TO RELATED APPLICATIONS

This application is a division of U.S. application Ser. No. 13/125,092 filed on Apr. 20, 2011, which is a national-stage of International Application No. PCT/EP2009/063668 filed on Oct. 19, 2009. The entire disclosures of these earlier applications are hereby incorporated herein by reference.

FIELD OF THE INVENTION

The present invention relates to attaching functional objects in tyres for vehicle wheels. These objects may be sensors, identification circuits, and/or members suitable for communicating with an environment of the tyre, for monitoring its operation and evolution of its physical characteristics, and for providing alarms, all more or less sophisticated functions designed for tyres that are called instrumented or intelligent.

PRIOR ART

It is known that the installation in a tyre of objects that represent a source of non-uniformity and that must remain in working order for long periods represents a difficult problem. Specifically, the object is supposed to remain functional throughout the whole service life of the tyre, and to do so in conditions that preserve the physical and functional integrity of the tyre, on the one hand, and of the object itself on the other hand, in a particularly harsh environment. Such is the case notably with physical stresses, impacts, vibrations, as well as bending, tensile, and compression stresses, to which the object can be exposed during the phases of manipulation, storage, and installation on rims of the tyre casings, and during periods of running. Added to this are the phenomena of aging of the materials and the impact of temperature changes that may occur during the time of non-use of the vehicle with tyres thus fitted.

Many proposals have already been made to attempt to solve these problems. Thus, European patent application publication EP 0 639 472 describes incorporating, inside a wall of a tyre casing, a transponder in a glass receptacle coated with a synthetic resin having impact-resistance properties. The transponder is immersed in an excrescence of the gum forming the tyre in a position conducive to communication with an apparatus external to the tyre.

European patent application publication EP 0 689 950 describes incorporating into a tyre a self-powered active electronic circuit. The circuit is encapsulated in a rigid or semi-rigid material, which prevents its deformation. The encapsulated circuit may be enclosed in a flexible casing such as a pocket or a cover. The materials recommended for this casing may comprise natural or synthetic, flexible and elastic gums having a Shore A hardness of between 50 and 95 and preferably between 55 and 75. The assembly is attached to a wall of the tyre, for example in a cavity formed during curing and/or by a cover in a material bonded by an appropriate adhesive to an inner wall of the tyre.

Although the measures recommended in these few examples make it possible to alleviate certain of the difficulties pointed out or to minimize the effects thereof, it has however to be stated that the field still remains wide open for improving the methods of attaching functional objects in tyres, for example when seeking to avoid, for economic reasons, systematic recourse to electronic modules mechanically reinforced for their incorporation into the tyre, while retaining or improving the reliability thereof in their applications.

SUMMARY OF THE INVENTION

It is in this context that the subject of the invention is an improved method of attaching a functional object to a tyre, which notably provides excellent protection of the functional object (e.g. an electronic circuit) against the many notably mechanical stresses that can affect the functional object throughout its service life while attached to or in the tyre.

According to an aspect of the invention, a member for a tyre is characterized in that the member includes a functional object in suspension in a soft substance of very high deformability.

The phrase "deformability of a material" as used herein means the ability of the material to deform under a given stress. The deformability of a material increases as its modulus of rigidity or its hardness decreases.

When a functional object is coated with such a soft substance and is placed in or on a wall of a tyre, practically all the stresses that the wall of the tyre sustains are absorbed by this soft substance and are not transmitted to the functional object.

Preferably, a soft substance of very high deformability has a Shore A hardness of less than 5.

Considering a modulus of rigidity as a secant modulus of extension at a deformation of 10% and at ambient temperature, the modulus of rigidity of a soft substance is preferably less than 0.3 MPa.

Considering a modulus of rigidity to be a dynamic shear or compression modulus, the dynamic shear modulus of a soft substance is preferably less than 50,000 Pa, measured with an alternate shear stress at ambient temperature.

Preferably, the soft substance has a dynamic shear modulus of less than 50,000 Pa in a temperature range of between −40° C. and +100° C.

This makes it possible to obtain an excellent absorption of stresses in the whole range of temperatures of use of a tyre.

The material forming the soft substance is preferably incompressible.

The soft substance may consist of a material chosen from the group of thermoplastic elastomer gels, thermosetting elastomer gels, and polymeric colloidal solutions.

Elastomer gels are materials of which the mechanical behaviour is that of an elastomer and which have a very great deformability or flexibility. These materials are currently being widely developed and are notably used for mammary prostheses or horse or cycle saddles.

These elastomer gels have a very diverse chemical nature. Some examples include styrene-based block-copolymer-based thermoplastic gels, such as SBS, SIS, SIBS, SEBS, and SEPS greatly stretched by oils or other stretching agents in order to obtain the desired flexibility properties. Other examples include polyurethane-based thermosetting gels (e.g., Vorastar from Dow Chemicals) or silicone-based thermosetting gels (e.g., those from Momentive Performance Chemicals Inc.).

Polymeric colloidal suspensions may also have properties close to those of the foregoing elastomer gels.

According to a another embodiment, the member also includes an outer protective casing made of a rubbery material compatible with the materials of a tyre.

This outer protective casing may be arranged to be attached to an inner or an outer face of a wall of a tyre.

The outer protective casing may also be arranged so that the member can be placed in a pocket fitted in a wall of a tyre. This pocket may or may not be externally open-ended.

This can be done at the time of manufacturing a crude tyre blank.

Alternatively, the soft substance surrounding the functional object can be placed in such a pocket after the tyre is cured, provided an access opening has previously been made in a face of the tyre wall.

The soft substance may also be a viscous fluid.

When the soft substance is a viscous fluid, it may be advantageous to mechanically link the functional object to the wall of the pocket or of a pouch in order to limit the freedom of movement of the object when the tyre is running.

The functional object of the member is advantageously a passive radiofrequency identification transponder furnished with two antennas forming a dipole. Such a transponder is usually called an RFID.

A further aspect of the invention is an instrumented tyre for a vehicle wheel, the tyre including a wall to which or in which a functional object is attached at a given location. This tyre is characterized in that the functional object is held in suspension in a soft substance attached to the wall and in that the soft substance has a deformability under stress that is much greater than a deformability under stress of a material or materials forming the wall at the location where the object is attached.

Advantageously, the modulus of rigidity of the material or materials forming the wall of the tyre at the location where the functional object is attached is at least ten times higher than that of the soft substance.

The term "tyre" as used herein is intended to mean a "pneumatic casing," that is to say, an inflatable object used as an interface between a wheel rim and the ground; and a "non-pneumatic tyre," that is to say, an object fulfilling the same interface function but not inflatable. In both cases, it may be useful to incorporate a functional object, and the attachment methods described herein will very substantially improve its endurance in service.

The quality of protection provided by embodiments of the invention relative to the stresses of the medium surrounding the object is such that an extensive mechanical reinforcing of the object is not inevitably necessary. This clearly has consequences for reducing the costs associated with the object. In certain cases, it may even become possible to remove all encapsulation around the objects (e.g., encapsulation around electronic circuits forming the objects) before coating them with the soft substance necessary for mounting them in "suspension" in a wall of a tyre, according to embodiments of the invention.

BRIEF DESCRIPTION OF THE FIGURES

Other features and advantages of the invention emerge from the description given below with reference to the appended drawings, which show, as non-limiting examples, embodiments of the invention.

DESCRIPTION OF ONE OR MORE EXEMPLARY EMBODIMENTS

Figure 1:
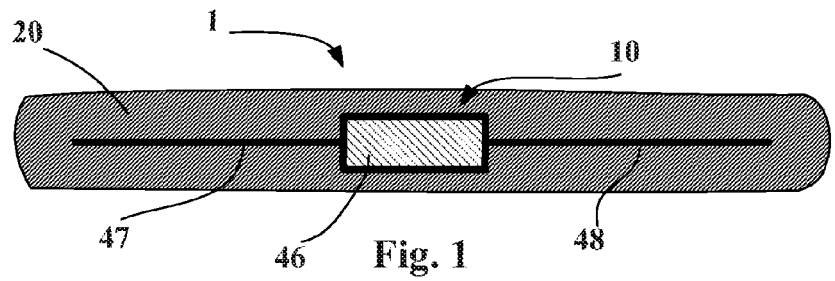
FIG. 1 represents a view in section of a member that includes a functional object in suspension in a soft substance.

FIG. 1 shows in section a member 1 in its simplest form. This member 1 includes a functional object 10 surrounded by a soft substance, in this instance an elastomer gel.

The functional object 10 may be an electronic circuit for making it possible to identify a tyre casing on the basis of an interrogation by radio (RFID), or the functional object 10 may be a sensor for monitoring or inspecting an environment or an operation of this casing.

FIG. 1 shows in section an electronic circuit 10 that includes an RFID transponder 46 with a parallelepipedal body, formed by an assembly of electronic components, extended on either side of the body by two rectilinear conductors 47 and 48, which may be straight or twisted, forming a dipole antenna. This electronic circuit 10 is coated in a soft substance, in this instance an elastomer gel 20. Such an assembly allows the member 1 to have a generally tubular shape, made thinner at its two ends, with a substantially ellipsoid cross section.

An embodiment with such a member 1 is described for a thermosetting elastomer gel (e.g., TSE 3062 silicone gel from Momentive Performance Materials Inc.). It begins by mixing two liquid constituents of the silicone gel; then the mixed liquid obtained is poured into a cavity of a mould with a geometry suited to the shape of the member 1, until it reaches half-way up; a first reticulation of the silicone gel is carried out at a temperature and for a suitable time to make the liquid gellify; the RFID transponder 46 and its two dipole antennas 47 and 48 are then inserted; the cavity of the mould is then filled with the mixed liquid containing the two components of the silicone gel, and a complete reticulation cycle is carried out on the silicone gel.

This produces the member 1. It is noted in particular that this member 1 exhibits excellent adhesion between the antennas of the transponder, which may be metal, and the gel.

It is then possible to incorporate the member 1 into a tyre during a raw manufacture of its blank. It is known that components of a blank of a tyre are stacked successively one on top of the other. During this operation, the member 1 is positioned in an intended location on one of plural layers of raw gum. After having completed producing the raw blank, the latter is placed in a mould in order to cure the components of the tyre and make the tyre ready for use. The member 1 is thus placed in a closed pocket of the tyre. The elastomer gel 20 is a material with incompressible elastic behaviour. This allows it to withstand forces associated with the manufacture and curing of the tyre blank.

Figure 2:
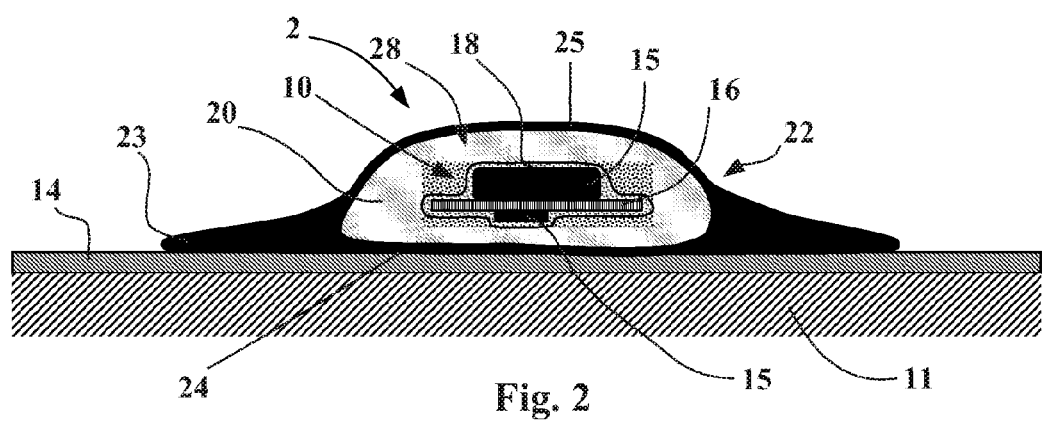
FIG. 2 represents a view in section of a second member attached to a surface of a layer of internal gum (GI) of an instrumented tyre.

The member may include a protective casing around the soft substance. FIG. 2 shows such a member 2 attached to a free face of an inner gum layer (GI) 14 of a wall 11 of a tyre. The electronic circuit 10 includes, in conventional manner, one or more integrated electronic components 15 mounted on a (flexible or rigid) printed circuit board 16. Such an assembly is encapsulated in a resin 18. The assembly is coated by or immersed in a mass of soft substance that includes an elastomer gel 20 in which the circuit 10 is suspended. The elastomer gel 20 fills an entirety of an internal space of a protective casing made of elastomer. This casing thus forms a pouch 22. The pouch 22 typically includes two thin layers 24 and 25 of a rubber gum, for example gum similar to the inner gum 14 of the tyre for which the pouch 22 is intended. One of these layers, a bottom layer 24, is attached to the free face of the inner gum 14. The other layer 25 defines with the bottom layer 24 a pocket 28 filled with the elastomer gel 20. Edges 23 of the two layers 24 and 25 are sealed to one another all around the pocket 28 by curing. The encapsulating resin 18 makes it easier to handle the circuit 10 and promotes excellent adhesion between the gel 20 and the functional object, that is, the circuit 10. The resin 18 may have a chemical nature similar to that of the elastomer gel 20, but with markedly greater rigidity.

Assembly of the bottom gum layer 24 of the pouch 22 with a wall of the inner gum 14 of the tyre can be carried out in several ways, including by direct bonding of this bottom gum layer 24 to the inner gum 14 with or without interposition of a layer of connecting gum.

Figure 3:
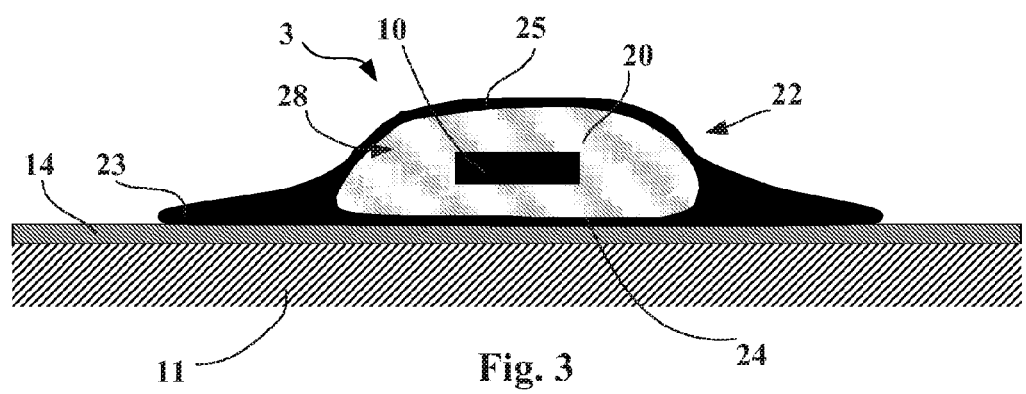
FIG. 3 is a view similar to FIG. 2 of a third member with a simplified implementation.

The member 3 shown in FIG. 3 includes an electronic circuit or functional object 10 placed directly in the elastomer gel 20 without encapsulation. This is possible and advantageous when adhesion between a surface of the circuit 10 and the elastomer gel 20 is good and when there is no risk of products migrating between the gel 20 and the circuit 10.

In the three examples described, the gel 20 is an elastomer gel, that is to say the gel 20 has a mechanical behaviour of an elastomer with a very great deformability or flexibility. When stresses are sustained by the wall 11 of the tyre, they are transmitted directly to the gel 20 or to the layer 24 of the pouch 22. But, because of the very great deformability of the elastomer gel 20, these stresses are absorbed by the gel 20 without notable forces being transmitted to the rigid electric circuit 10. When the stresses stop, the gel 20 resumes its initial shape. It is preferable that there is good adhesion between the elastomer gel 20 and the layers 24 and 25 of the pouch 22 or the adjacent walls of the tyre, but this is not necessary. When there is no adhesion between the walls and the gel 20, a very low coefficient of friction between the elastomer gel 20 and the walls is desirable so that there is no heating due to relative movements between the gel 20 and these walls. An example of an elastomer gel suitable for these specifications is the reticulated silicone gel TSE 3062 from Momentive Performance Materials Inc.

Measurements of a modulus of extension have been taken on samples or test pieces of the above elastomer gel at ten (10) percent elongation, which have provided values of a secant modulus of 0.05 MPa (megapascals). A hardness of this gel is too low to be measured with a Shore A durometer.

These measurements were taken at ambient temperature (23° C.) and in first elongation. The modulus of extension, at a given deformation, corresponds to a ratio between an extension force measured at an elongation corresponding to the given deformation divided by an initial section of a test piece and a deformation value at the given elongation.

It should be noted that a secant modulus at 10% of an inner gum is typically of the order of 2.7 MPa, namely more than fifty times the modulus of extension of the elastomer gel tested.

Figure 4:
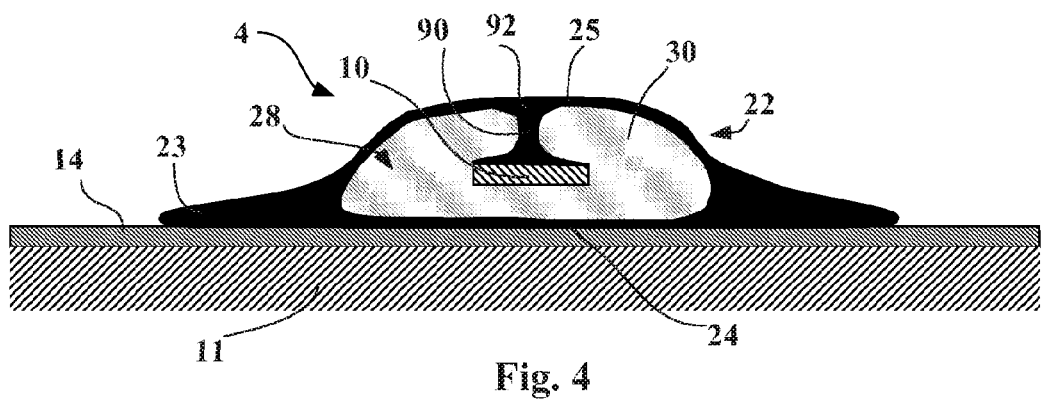
FIG. 4 is a view similar to FIG. 2, in which the soft substance is a viscous fluid.

FIG. 4 shows a member 4 according to another embodiment, in which the soft substance is a viscous fluid 30. In this case, the fluid, by its movements in the pocket 28, allows excellent absorption of all the stresses transmitted by the wall 11 of the tyre. Moreover, in order to prevent the electronic circuit 10 from moving too much inside the pocket 28, it is possible to adjust the viscosity of the fluid 30. It is also possible to mechanically connect the circuit 10 to one of the layers 25 around the pocket 28, preferably the outer layer 25. This is what is illustrated in FIG. 4. A mechanical connection 90 is arranged between the circuit 10 and the layer 25. This connection is a tongue, stem, or block 90 having one end 92 attached towards the centre of the layer 25 on the free side of the pouch 22 and the other end directly attached to a wall of the suspended circuit or object 10. Movements of the object 10 inside the pocket 28, under action of dynamic stresses to which the object 10 may be subject while the tyre is running, are absorbed by the viscosity of the viscous fluid 30, which tends to creep around the object 10. However, the tongue, stem, or block 90 acts as a spring to return the object 10 to its equilibrium position in the pouch 22. This "spring" 90 may be made of the same material as the flexible pouch 22 itself, or of another elastic material, or even of a rigid material, (but a material that can be inclined by deformation of the pouch 22 to which it is attached).

The member 1 can also be inserted after curing in a tyre into a pocket previously arranged in a wall of a tyre and which culminates in an opening in the form of a slot on a surface of an inner gum, thus producing a kind of buttonhole (not shown).

The mounting described herein makes it possible to effectively protect the electronic circuit 10 in a particularly severe environment of a tyre facing various forms of attack, not only mechanical, but also physical and chemical attacks during use.

Specifically, it is known that a tyre casing when running sustains vibrations, impacts and compression, tensile, bending, and shear stresses, which are all causes of fatigue. Thus, for example, during cyclical deformations of the casing on each wheel rotation when passing from a crown are into a zone of contact, the casing's wall sustains considerable bending forces back and forth between entrance into and exit from this zone. Sidewall zone portions corresponding to the zone of contact are also deformed cyclically in bending and in compression while the other portions of the sidewall zone sustain tensile and compression stresses from turns, all forces that are capable of affecting the long-term integrity of a functional object and of its attachment to a tyre wall and of causing damage to an operation thereof.

For all these reasons, the electronic circuits used increasingly frequently in tyres are very generally mechanically reinforced objects. Integrated circuits used and their assembly with other components are reinforced. They are also encapsulated in very strong resins in order to form compact assemblies (packaging). A result of this is an increase in the price of such assemblies and an increase in the size and weight of the overall structure, which is then difficult to miniaturize.

The absorption of the stresses capable of affecting a functional object by virtue of its being suspended in a soft substance, such as the gel 20, is a worthwhile improvement in this respect.

Figure 5:
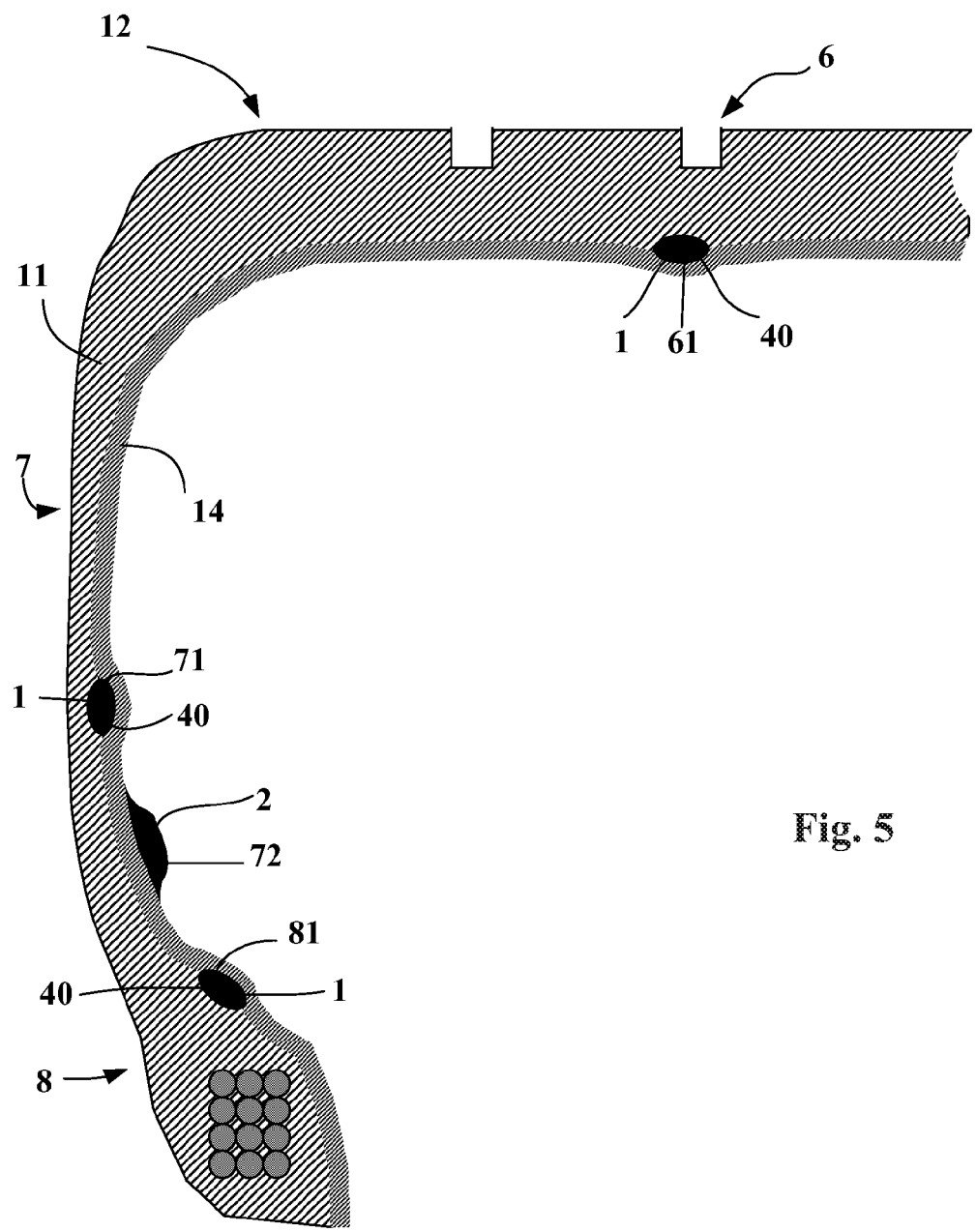
FIG. 5 shows members implanted in a wall of a tyre casing in three different locations and a member attached to a location on this wall.

As shown in FIG. 5, several locations can be envisaged for attaching members 1, 2, 3 in a tyre casing 12. The tyre casing 12 includes a crown 6, a sidewall 7 and a bead 8. A first implantation is shown in a zone 81 in the bead 8. A chamber 40 is filled by a member 1. Walls of the chamber 40 are formed, on the one hand, of the inner gum 14 and, on the other hand, a reinforcing gum of a carcass ply (not shown). The inner gum 14 has a modulus of elasticity at 10% of the order of 2.7 MPa, that is to say much higher than that of the gel 20. A second implantation of a member 1, shown in FIG. 5, is in the sidewall 7 of the casing 12 on the inside at a location 71; a second chamber 40 is filled with that member 1. Walls of this second chamber 40 may be formed of the inner gum 14, or of sidewall gum itself, or of carcass ply calenderings, or the previously mentioned reinforcing gum. In all cases, the deformability of the gel is very much greater than that of the gums or adjacent materials of the tyre. It is also possible to place a member 1 in the crown 6 in a zone 61.

FIG. 5 also shows a possible implantation of a pouch-type member 2, of the type shown in FIGS. 2, 3, and 4 bonded to an inner surface of the sidewall 7 in a zone 72. Naturally, the location of the pouch-type member 2 is not strictly limited to the location illustrated. Moreover the members can be oriented in a direction substantially parallel to the axis of rotation of the tyre or on the contrary perpendicular to the latter.

Therefore, the applicants have found, in a manner that is not obvious, that it is possible to obtain excellent results by using such a solution to keep in suspension an element that has to be protected against the disturbances affecting not a relatively rigid support, but a medium which is itself very deformable, such as the wall of a tyre casing designed to move in conditions of use that are severe in many respects. It has been possible notably to find that the object 10 "suspended" in the medium reticulated by curing of the gel 20 could be kept away from the walls of the chamber 40 even when the latter are subjected to considerable deformations from the tyre casing with which this pocket is associated.

The use of the mounting solution according to the invention has been mentioned for passive transponders. It should be specified that it also applies generally to circuits of sensors for measuring surrounding physical magnitudes such as pressure and temperature, without the presence of the soft substance between a sensitive portion of the sensor and the inside of the tyre forming an obstacle. Specifically, this substance does not work against, notably, transmission or sensing of the pressure that prevails in the tyre casing and that acts on the pouch that contains it, nor does it work against the temperature of the surrounding medium, for example the gums of the tyre in the location of the sensor. These physical parameters can therefore be measured through the encapsulation formed by the pouch and its gel both when stationary and when running. It will be noted that, in certain mounting configurations (notably beneath the crown of the tyre) the apparent pressure on the sensor may rise above the real pressure because of the relatively high centrifugal forces that affect the mass of the soft substance. However, this phenomenon is not a reason for failure. Specifically, it simply creates a variation in the measurement of the real pressure which is fairly easy to set aside when the speed of the vehicle is known.

With regard to economic matters, cost savings can be made by using the absorption technique proposed by the invention. It has been seen that the latter makes it possible to use electronic circuits that are less reinforced than hitherto against the external mechanical and physical assaults, and even to use unreinforced circuits that can simply be selected from elements manufactured in very large quantities and available "off the shelf," which makes it possible to considerably reduce the cost thereof.

Finally, it is noted that the functional object is properly protected not only during the functional life of the tyre casing to which it is attached but also during the manufacture of the latter when it is itself incorporated therein before curing.

The invention is not limited to the examples described and represented and various modifications can be made thereto without departing from its context defined by the appended claims.

The invention claimed is:

1. An instrumented tyre for a vehicle wheel, the tyre comprising:
    a wall; and
    an object attached to the wall at a given location,
    wherein the object is held in suspension in a soft substance,
    wherein the object is attached to the wall via the soft substance,
    wherein the soft substance has a deformability under stress that is greater than a deformability under stress of a material forming the wall at the given location,
    wherein the soft substance has a secant modulus of elasticity in extension of less than 0.3 MPa at 10% deformation and at ambient temperature, and
    wherein the soft substance is elastically deformable such that the soft substance deforms from an initial shape to a stressed shape when under stress, and the soft substance returns to the initial shape when the stress is removed.

2. The instrumented tyre according to claim 1, wherein a modulus of rigidity of the material forming the wall at the given location is at least ten times higher than a modulus of rigidity of the soft substance.

3. The instrumented tyre according to claim 1, wherein the object is suspended in the soft substance such that the object is entirely encapsulated by the soft substance.

4. The instrumented tyre according to claim 1, wherein the soft substance has a secant modulus of elasticity in extension of 0.05 MPa at 10% deformation and at ambient temperature.

5. The instrumented tyre according to claim 1, wherein the soft substance has a dynamic shear modulus of less than 50,000 Pa at ambient temperature.

6. The instrumented tyre according to claim 1, wherein the soft substance has a dynamic shear modulus of less than 50,000 Pa in a temperature range of between −40° C. and 100° C.

7. The instrumented tyre according to claim 1, wherein the soft substance has a Shore A hardness of less than 5.

8. The instrumented tyre according to claim 1, wherein the soft substance is a material chosen from any of:
    thermoplastic elastomer gels,
    thermosetting elastomer gels, and
    polymeric colloidal solutions.

9. The instrumented tyre according to claim 1, wherein the soft substance is a silicone-based thermosetting elastomer gel.

10. The instrumented tyre according to claim 1, further comprising an outer protective casing for the object, the casing being made of a rubbery material compatible with materials of a tyre.

11. The instrumented tyre according to claim 10, wherein the outer protective casing is arranged to be attached to an inner face or an outer face of the wall.

12. The instrumented tyre according to claim 10, wherein the outer protective casing is arranged so that the object can be placed in a pocket fitted in the wall.

13. The instrumented tyre according to claim 1, wherein the soft substance is a viscous fluid.

14. The instrumented tyre according to claim 1, wherein the object is mechanically bound to a protective casing.

15. The instrumented tyre according to claim 1, wherein the object is a passive radiofrequency identification transponder equipped with two antennas forming a dipole.

* * * * *